(12) United States Patent
Wang

(10) Patent No.: US 11,156,868 B2
(45) Date of Patent: Oct. 26, 2021

(54) CHARGE RELEASE CIRCUIT AND DRIVING METHOD THEREFOR, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Yunqi Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/617,156

(22) PCT Filed: Mar. 28, 2019

(86) PCT No.: PCT/CN2019/080145
§ 371 (c)(1),
(2) Date: Nov. 26, 2019

(87) PCT Pub. No.: WO2019/184989
PCT Pub. Date: Oct. 3, 2019

(65) Prior Publication Data
US 2020/0201116 A1    Jun. 25, 2020

(30) Foreign Application Priority Data
Mar. 29, 2018  (CN) .......................... 201810270929.4

(51) Int. Cl.
*G02F 1/13357*   (2006.01)
*G09G 3/26*      (2006.01)
(Continued)

(52) U.S. Cl.
CPC ..... *G02F 1/133602* (2013.01); *G09G 3/3233* (2013.01); *G09G 3/36* (2013.01)

(58) Field of Classification Search
CPC ... G02F 1/133602; G09G 3/3233; G09G 3/36
See application file for complete search history.

(56) References Cited

U.S. PATENT DOCUMENTS

| | | | |
|---|---|---|---|
| 9,439,265 B1 * | 9/2016 | Fan | G09G 3/3233 |
| 2004/0036788 A1 * | 2/2004 | Chapman | H04N 5/367 348/308 |

(Continued)

FOREIGN PATENT DOCUMENTS

| | | |
|---|---|---|
| CN | 1910643 A | 2/2007 |
| CN | 1949350 A | 4/2007 |

(Continued)

OTHER PUBLICATIONS

Second Office Action issued in corresponding Chinese Application No. 201810270929.4, dated May 25, 2020, with English language translation.

(Continued)

*Primary Examiner* — Wing H Chow
(74) *Attorney, Agent, or Firm* — McDermott Will and Emery LLP

(57) ABSTRACT

A charge release circuit includes a plurality of pixel circuits and at least one photosensitive control circuit, and each photosensitive control circuit is connected to at least one pixel circuit. Each pixel circuit of the at least one pixel circuit includes: a discharge circuit connected to the photosensitive control circuit, and a first capacitor connected to the discharge circuit and configured to store a display driving signal. The photosensitive control circuit is configured to control the discharge circuit to be turned on in a state (Continued)

FIG. 6 where a backlight of a display device is turned off to release residual charges in the first capacitor.

13 Claims, 7 Drawing Sheets

(51) Int. Cl.
*G09G 3/3233* (2016.01)
*G09G 3/36* (2006.01)

(56) References Cited

U.S. PATENT DOCUMENTS

| | | | |
|---|---|---|---|
| 2007/0080924 A1 | 4/2007 | Shin | |
| 2008/0002073 A1* | 1/2008 | Hwan Moon | G02F 1/133512 349/38 |
| 2008/0143942 A1 | 6/2008 | Chen et al. | |
| 2009/0015521 A1 | 1/2009 | Fish | |
| 2011/0199349 A1* | 8/2011 | Katoh | G01J 1/32 345/207 |
| 2017/0061917 A1 | 3/2017 | Chen et al. | |
| 2017/0178556 A1 | 6/2017 | Wu | |
| 2019/0019446 A1* | 1/2019 | Zhang | G09G 3/36 |
| 2019/0073947 A1 | 3/2019 | Huang et al. | |

FOREIGN PATENT DOCUMENTS

| | | |
|---|---|---|
| CN | 101572069 A | 11/2009 |
| CN | 101882416 A | 11/2010 |
| CN | 104914602 A | 9/2015 |
| CN | 105096888 A | 11/2015 |
| CN | 106356033 A | 1/2017 |
| CN | 107068081 A | 8/2017 |
| CN | 107195282 A | 9/2017 |
| KR | 10-2007-0102893 A | 10/2007 |
| WO | 03083818 A1 | 10/2003 |

OTHER PUBLICATIONS

International Search Report and Written Opinion issued in corresponding International Application No. PCT/CN2019/080145, dated Jul. 3, 2019, with English translation.

First Office Action issued in Chinese Application No. 201810270929.4, dated Feb. 25, 2020, with English translation.

* cited by examiner ations.

CHARGE RELEASE CIRCUIT AND DRIVING METHOD THEREFOR, AND DISPLAY DEVICE

CROSS-REFERENCE TO RELATED APPLICATIONS

This application is a national phase entry under 35 USC 371 of International Patent Application No. PCT/CN2019/080145 filed on Mar. 28, 2019, which claims priority to Chinese Patent Application No. 201810270929.4, filed with the Chinese Patent Office on Mar. 29, 2018, titled "CHARGE RELEASE CIRCUIT OF A DISPLAY DEVICE AND DRIVING METHOD THEREFOR, AND DISPLAY DEVICE", which are incorporated herein by reference in their entirety.

TECHNICAL FIELD

The present disclosure relates to the field of display technologies, and in particular, to a charge release circuit and a driving method therefor, and a display device.

BACKGROUND

A display principle of a liquid crystal display is to place liquid crystal molecules between two conductive substrates, and to control arrangement directions of the liquid crystal molecules by electric fields formed between electrodes of the two conductive substrates to transmit or block light emitted from a backlight in the liquid crystal display, thereby achieving a display of an image.

SUMMARY

In one aspect, a charge release circuit is provided. The charge release circuit includes a plurality of pixel circuits and at least one photosensitive control circuit, and each photosensitive control circuit of the at least one photosensitive control circuit is connected to at least one pixel circuit. Each pixel circuit of the at least one pixel circuit includes: a discharge circuit connected to the photosensitive control circuit, and a first capacitor connected to the discharge circuit and configured to store a display driving signal. The photosensitive control circuit is configured to control the discharge circuit to be turned on in a state where a backlight of a display device is turned off to release residual charges in the first capacitor. In some embodiments, the photosensitive control circuit is further configured to control the discharge circuit to be turned off in a state where the backlight of the display device is turned on, so that the pixel circuit controls the display device to display an image.

In some embodiments, the photosensitive control circuit includes at least one photosensitive diode and a second capacitor. A first electrode of each photosensitive diode is connected to the discharge circuit and a first electrode of the second capacitor, and a second electrode of the photosensitive diode is connected to a first voltage terminal. The first electrode of the second capacitor is further connected to the discharge circuit, and a second electrode of the second capacitor is connected to the first voltage terminal.

In some embodiments, the at least one photosensitive diode includes a plurality of photosensitive diodes connected in parallel.

In some embodiments, the discharge circuit includes a first transistor. A control electrode of the first transistor is connected to the photosensitive control circuit, a first electrode of the first transistor is connected to a first electrode of the first capacitor, and a second electrode of the first transistor is connected to a common voltage terminal.

In some embodiments, the first transistor is a depletion-mode transistor.

In some embodiments, the pixel circuit further includes a second transistor. A control electrode of the second transistor is connected to a scanning signal terminal, a first electrode of the second transistor is connected to a data signal terminal, and a second electrode of the second transistor is connected to the first electrode of the first capacitor. A second electrode of the first capacitor is connected to the common voltage terminal.

In some embodiments, the at least one photosensitive control circuit includes a plurality of photosensitive control circuits connected in parallel.

In some embodiments, the at least one photosensitive control circuit includes a plurality of photosensitive control circuits. Pixel circuits in at least one row are connected to one of the plurality of photosensitive control circuits. Or, pixel circuits in at least one column are connected to one of the plurality of photosensitive control circuits.

In another aspect, an array substrate is provided. The array substrate includes the charge release circuit according to some embodiments described above.

In some embodiments, the array substrate further includes a driver IC. At least one discharge circuit in the charge release circuit is further connected to the driver IC.

In some embodiments, the array substrate further has a display area and a non-display area disposed at a periphery of the display area. At least one photosensitive control circuit in the charge release circuit is disposed in the non-display area.

In some embodiments, the array substrate further includes a plurality of pixels. Each pixel of the plurality of pixels is provided with a pixel circuit. At least one photosensitive control circuit in the charge release circuit is disposed in non-display region(s) of pixel(s) in which pixel circuit(s) connected to the at least one photosensitive control circuit is located.

In yet another aspect, a display device is provided. The display device includes the array substrate according to some embodiments described above.

In yet another aspect, a method of driving a charge release circuit is provided. The method of driving a charge release circuit includes: controlling, by the photosensitive control circuit, the discharge circuit to be turned off in a state where the backlight of the display device is turned on, so that the display device displays an image; and controlling, by the photosensitive control circuit, the discharge circuit to be turned on in a state where the backlight of the display device is turned off, so as to release residual charges in the first capacitor connected to the discharge circuit.

In some embodiments, the photosensitive control circuit includes a photosensitive diode and a second capacitor, and the discharge circuit includes a first transistor.

The step of controlling, by the photosensitive control circuit, the discharge circuit to be turned off in the state where the backlight of the display device is turned on, so that the display device displays the image, includes: turning on the backlight, reversely turning on the photosensitive diode, charging the second capacitor, and controlling the first transistor to be turned off, so that the display device displays the image.

The step of controlling, by the photosensitive control circuit, the discharge circuit to be turned on in the state where the backlight of the display device is turned off, so as to release the residual charges in the first capacitor connected to the discharge circuit, includes; turning off the backlight, forward turning on the photosensitive diode, discharging the second capacitor, and controlling the first transistor to be turned on, so that the residual charges in the first capacitor are released through a loop formed by the first transistor.

BRIEF DESCRIPTION OF THE DRAWINGS

In order to describe technical solutions in some embodiments of the present disclosure more clearly, the accompanying drawings to be used in the description of disclosure will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

Figure 1:
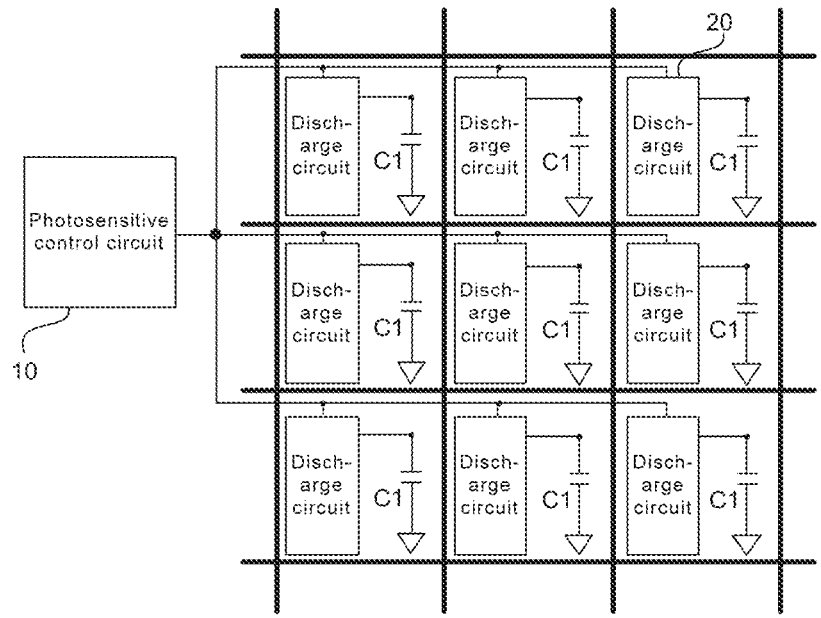
FIG. 1 is a schematic diagram showing a structure of a charge release circuit, according to some embodiments of the present disclosure.

The technical solutions in some embodiments of the present disclosure will be described clearly and completely with reference to the accompanying drawings in some embodiments of the present disclosure. Obviously, the described embodiments are merely some but not all of embodiments of the present disclosure. All other embodiments made on the basis of some embodiments of the present disclosure by a person of ordinary skill in the art without paying any creative effort shall be included in the protection scope of the present disclosure.

A liquid crystal display is generally driven by an active matrix method to display an image. For example, a common electrode and pixel electrodes disposed at both sides of a liquid crystal layer in the liquid crystal display form pixel capacitors, and voltage signals stored in the pixel capacitors may be updated or maintained through a coordination of scanning signals and data signals, thereby driving pixels in which the pixel capacitors are respectively located to complete the display. Based on this, in a case where the liquid crystal display does not display an image, it is need to release residual charges in the pixel capacitors to prevent liquid crystal molecules from being polarized, that is, to avoid a problem that the liquid crystal molecules are abnormally deflected due to a long-term action of a direct current (DC) voltage.

At present, a release of the residual charges in the pixel capacitors in the liquid crystal display needs to be actively controlled by a driver integrated circuit (IC). Thus, in a case where power is abnormally off or the IC is in a sleep state, it is difficult for the IC to release the residual charges in all the pixel capacitors in the liquid crystal display in an extremely short time (e.g., time of one frame to two frames). Therefore, it is impossible to ensure that residual charges in respective pixel capacitors corresponding to pixels in each row may be quickly and completely released, thereby easily reducing an operational reliability of the liquid crystal display.

Some embodiments of the present disclosure provide a charge release circuit. Referring to FIGS. 1 to 5 and FIGS. 13 and 17, the charge release circuit includes at least one photosensitive control circuit 10, and each photosensitive control circuit 10 of the at least one photosensitive control circuit 10 is connected to at least one pixel circuit 2. Each pixel circuit 2 includes a discharge circuit 20 connected to the photosensitive control circuit 10, and a first capacitor C1 connected to the discharge circuit 20. The first capacitor C1 is configured to store a display driving signal. The photosensitive control circuit 10 is configured to control the discharge circuit 20 to be turned on in a state where a backlight 1002 of a display device 100 is turned off to release residual charges in the first capacitor C1, and is configured to control the discharge circuit 20 to be turned off in a state where the backlight 1002 of the display device 100 is turned on, so that the pixel circuit 2 controls the display device 100 to display an image.

It will be noted that, in a case where the display device 100 is a liquid crystal display, the backlight 1002 of the display device is a direct-lit backlight or an edge-lit backlight. Each pixel of the display device 100 is generally provided with a pixel circuit 2 therein. A first capacitor C1 in each pixel circuit 2 is a pixel capacitor of a corresponding pixel. The pixel circuit 2 described above serves as a display driving circuit of the corresponding pixel, and may also have other structures. Some embodiments of the present disclosure do not limit the structure of the pixel circuit 2.

Figure 13:
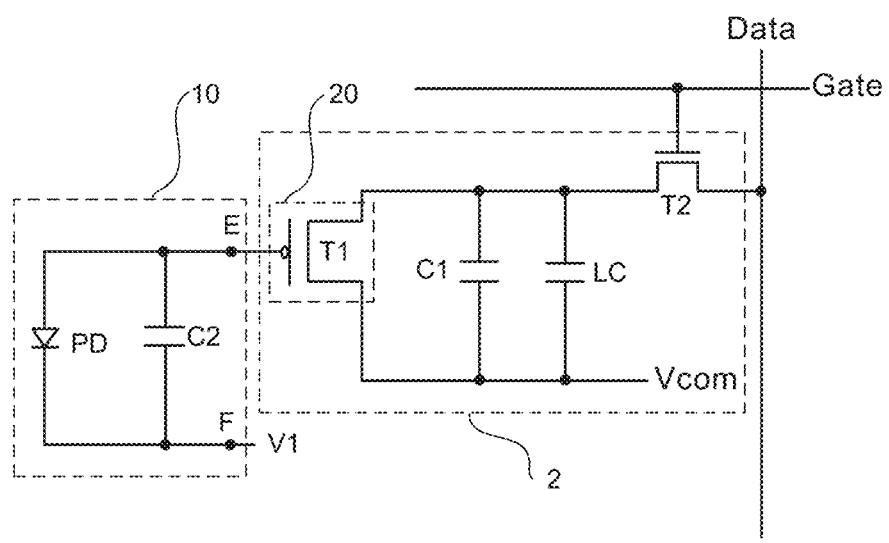
FIG. 13 is a schematic diagram showing a structure of yet another charge release circuit, according to some embodiments of the present disclosure.

Optionally, referring to FIG. 13, the pixel circuit 2 further includes a second transistor T2. A control electrode of the second transistor T2 is connected to a scanning signal terminal Gate, a first electrode of the second transistor T2 is connected to a data signal terminal Data, and a second electrode of the second transistor T2 is connected to a first electrode of the first capacitor C1. A second electrode of the first capacitor C1 is connected to a common voltage terminal Vcom. Here, the second transistor T2 is an N-type transistor. Of course, it is also permissible that the second transistor T2 is a P-type transistor.

In some embodiments of the present disclosure, one or more photosensitive control circuits 10 are provided in the display device 100, and each photosensitive control circuit 10 is connected to at least one pixel circuit 2. The one or more photosensitive control circuits 10 may be used to control the first capacitor(s) C1 in the pixel circuit(s) 2 correspondingly connected to the one or more photosensitive control circuits 10 to release residual charges. That is, by selectively setting the number of the one or more photosensitive control circuits 10, and a connection relationship between the one or more photosensitive control circuits 10 and the pixel circuits 2, the charge release circuit in some embodiments of the present disclosure may release the residual charges in the first capacitors C1 of some of pixel circuits in the display device 100, or release the residual charges in the first capacitors C1 of all of the pixel circuits in the display device 100.

In addition, a control signal is generated by the photosensitive control circuit 10 under an action of an optical signal from the backlight 1002 of the display device 10, and is sent by the photosensitive control circuit 10. For example, when it is required for the display device 100 to display an image, the backlight 1002 is controlled to be turned on. In this case, the first capacitor C1 stores a display driving signal and does not release the residual charges, and thus the discharge circuit 20 connected to the first capacitor C1 is turned off under control of the photosensitive control circuit 10. That is, in the state where the backlight 1002 is turned on, affected by the optical signal from the backlight 1002, the photosensitive control circuit 10 generates a control signal for controlling the discharge circuit 20 to be turned off. Similarly, when it is not required for the display device 100 to display an image, the backlight 1002 is controlled to be turned off. In this case, the residual charges in the first capacitor C1 need to be released, and the discharge circuit 20 connected to the first capacitor C1 needs to be turned on under the control of the photosensitive control circuit 10. That is, in the state where the backlight 1002 is turned off, the photosensitive control circuit 10 cannot receive the optical signal from the backlight 1002, and the photosensitive control circuit 10 generates a control signal for controlling the discharge circuit 20 to be turned on.

As will be seen from the above, a turn-on state or a turn-off state of the discharge circuit 20 in the charge release circuit is controlled by the photosensitive control circuit 10. Since the control signal generated by the photosensitive control circuit 10 depends on the optical signal from the backlight 1002, the photosensitive control circuit 10 may directly control the discharge circuit 20 to be turned on in a case where the backlight 1002 is turned off, so as to release the residual charges in the first capacitor C1 Thus, even if power of the display device 100 is abnormally off or the IC of the display device 100 is in a sleep state, an effective control of the discharge circuit 20 by the photosensitive control circuit 10 will not be affected, which is advantageous to rapidly and completely release the residual charges in the first capacitors C1 in the display device 100, and may improve an operational reliability of the display device 100, especially a liquid crystal display device.

Of course, the discharge circuit 20 in the pixel circuit 2 is independently controlled by the photosensitive control circuit 10, or is dually controlled by the photosensitive control circuit 10 and a driver IC, which are both permissible.

For example, the discharge circuit 20 in the pixel circuit 2 is independently controlled by the photosensitive control circuit 10. Thus, a control circuit required by the discharge circuit 20 in the driver IC may not be provided, and a design of a power-down time sequence may not be provided as for the abnormal power failure or the IC sleep, which is advantageous for simplifying a structure of the driver IC and reducing a design difficulty of the driver IC.

For example, the discharge circuit 20 in the pixel circuit 2 is dually controlled by the photosensitive control circuit 10 and the driver IC. For example, a control of the discharge circuit 20 by the driver IC is set as a main control, and a control of the discharge circuit 10 by the photosensitive control circuit 10 is set as an auxiliary control. The discharge circuit 20 is dually controlled by using a control method in which the main control comes first, and the auxiliary control plays an auxiliary role, which may ensure that the residual charges in the first capacitors C1 in the display device 100 are quickly and completely released, thereby effectively improving an effect of eliminating the residual charges in the first capacitors C1 in the display device 100, and further improving the operational reliability of the display device 100. Vice versa.

In some embodiments, a plurality of photosensitive control circuits 10 are provided. The plurality of photosensitive control circuits 10 are connected to discharge circuits 20 in corresponding pixel circuits 2 in a plurality of ways.

Figure 2:
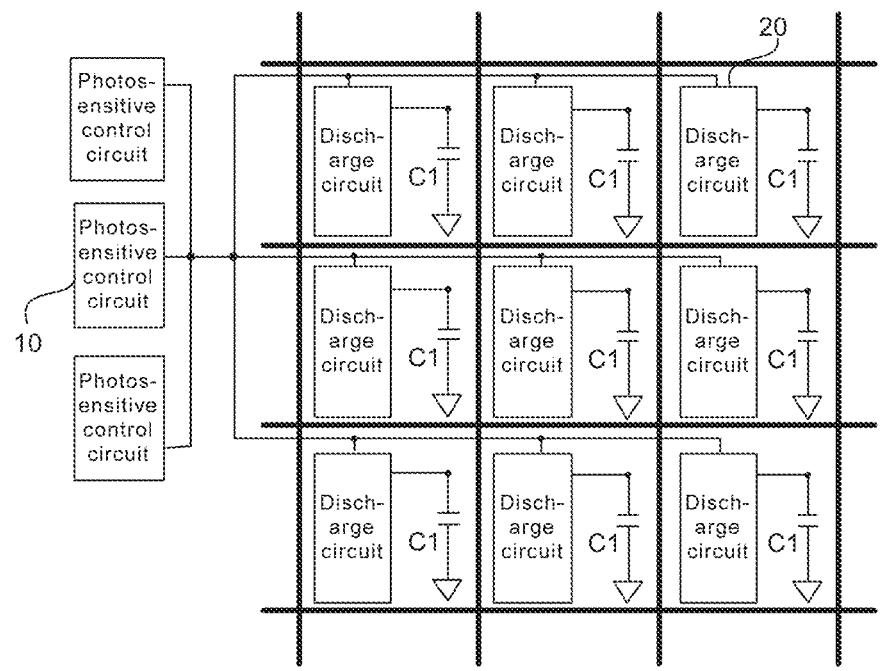
FIG. 2 is a schematic diagram showing a structure of another charge release circuit, according to some embodiments of the present disclosure.

Optionally, referring to FIG. 2, the plurality of photosensitive control circuits 10 are connected in parallel. Thus, if one of the plurality of photosensitive control circuits 10 fails, other photosensitive control circuits 10 may still generate the control signals to accurately and effectively control corresponding discharge circuits 20 to ensure the effect of eliminating the residual charges in the first capacitors C1.

Figure 3:
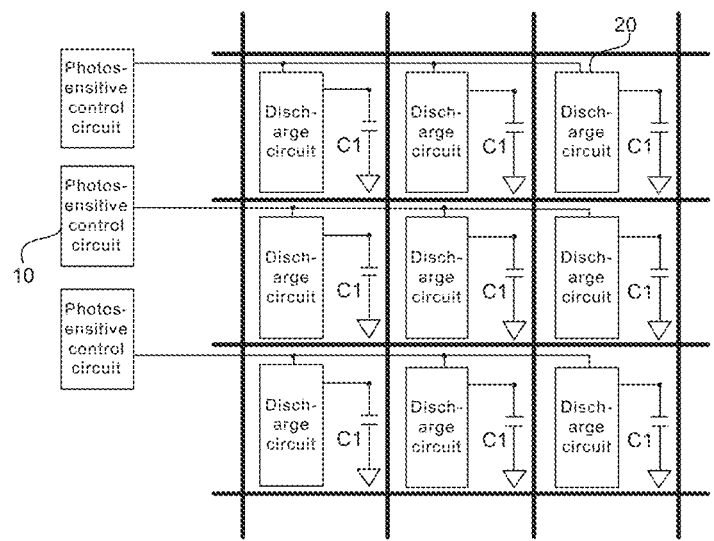
FIG. 3 is a schematic diagram showing a structure of yet another charge release circuit, according to some embodiments of the present disclosure.
Figure 4:
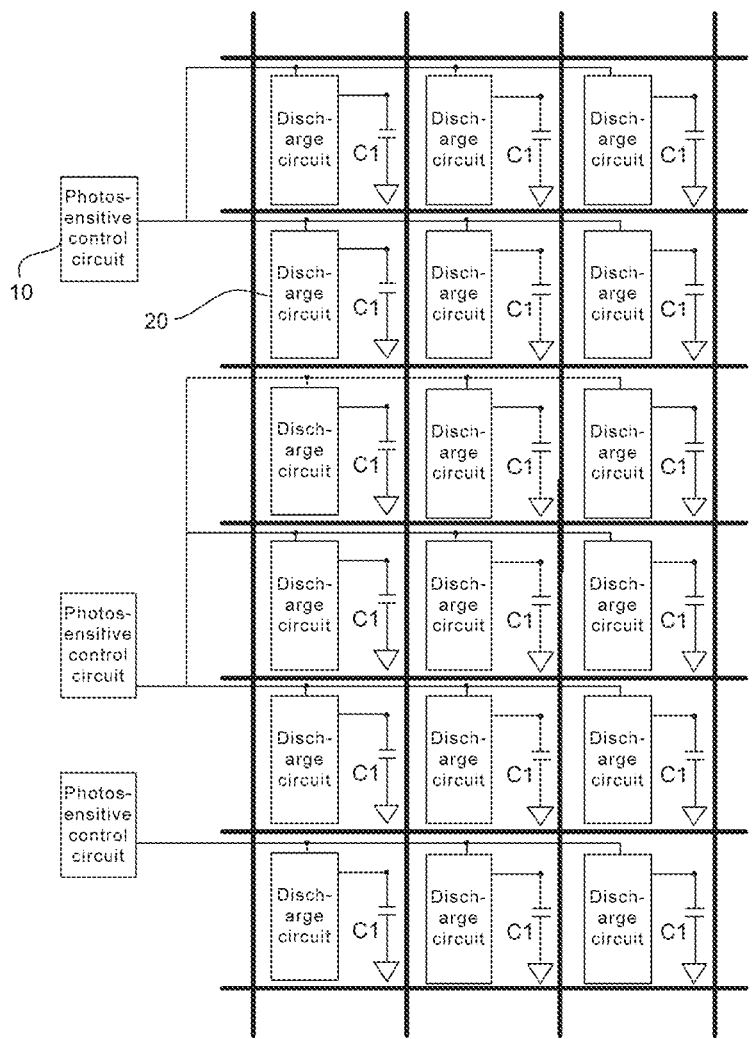
FIG. 4 is a schematic diagram showing a structure of yet another charge release circuit, according to some embodiments of the present disclosure.
Figure 5:
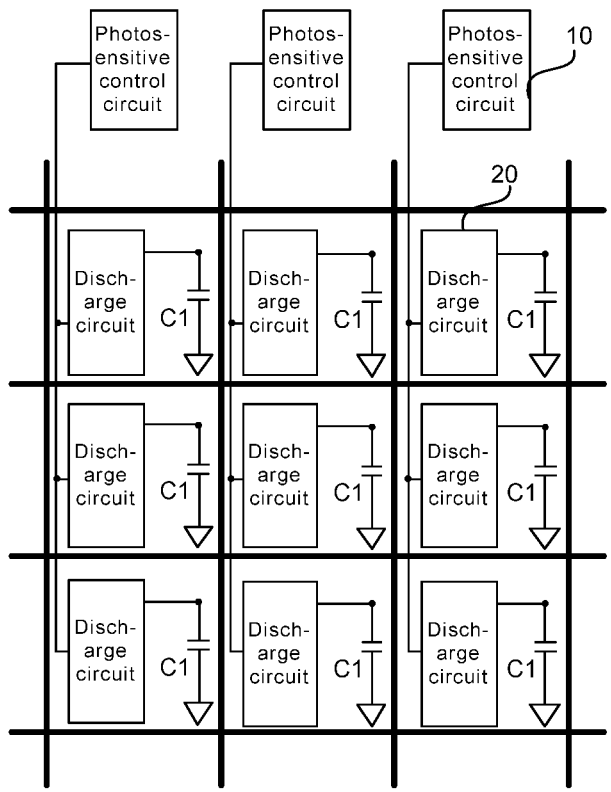
FIG. 5 is a schematic diagram showing a structure of yet another charge release circuit, according to some embodiments of the present disclosure.
Figure 6:
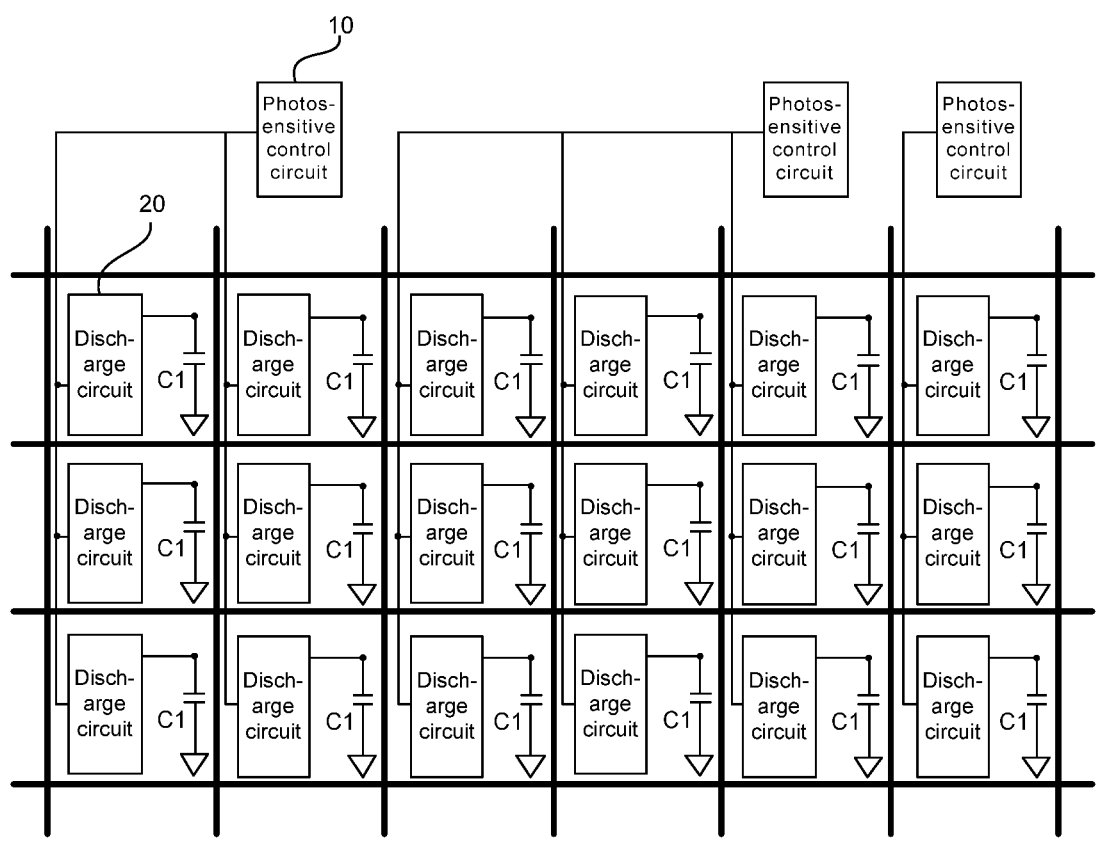
FIG. 6 is a schematic diagram showing a structure of yet another charge release circuit, according to some embodiments of the present disclosure.

Optionally, pixel circuits of a plurality of pixels are arranged in an array. Pixel circuits of pixels in each row are connected to a gate line that is used to transmit a scanning signal to the pixel circuits. Pixel circuits of pixels in each column are connected to a data line that is used to transmit data signals to the pixel circuits. For example, as shown in FIG. 3 or FIG. 4, each photosensitive control circuit of the plurality of photosensitive control circuits 10 is connected to pixel circuits in at least one row. Or, as shown in FIG. 5 or FIG. 6, each photosensitive control circuit 10 of the plurality of photosensitive control circuits 10 is connected to pixel circuits in at least one column. Thus, lengths of a portion of wires coupling the plurality of photosensitive control circuits 10 to the respective pixel circuits may be moderately shortened to prevent an accuracy of a signal transmission between the photosensitive control circuit 10 and the corresponding pixel circuits from being reduced due to a too long transmission wire, thereby ensuring the effect of eliminating the residual charges in each first capacitor C1, Of course, it is possible that the plurality of photosensitive control circuits 10 are in one-to-one correspondence with a plurality of pixel circuits, or other corresponding manners are also permissible, which some embodiments do not limit.

Figure 7:
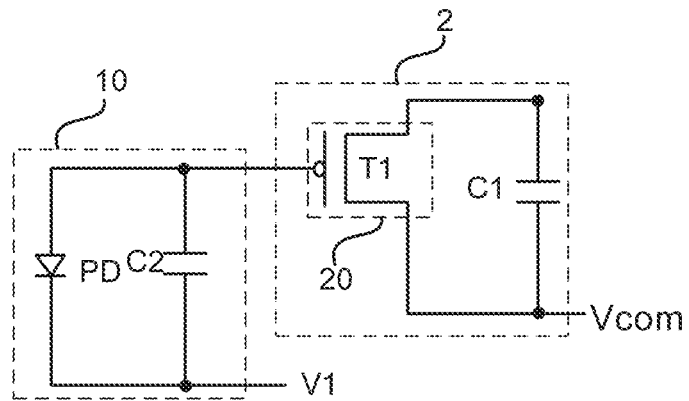
FIG. 7 is a schematic diagram showing a structure of yet another charge release circuit, according to some embodiments of the present disclosure.

In some embodiments, as shown in FIG. 7, the photosensitive control circuit 10 includes a photosensitive diode PD and a second capacitor C2. A first electrode of the photosensitive diode PD is connected to the discharge circuit 20 and a first electrode of the second capacitor C2, and a second electrode of the photosensitive diode PD is connected to a first voltage terminal V1. The first electrode of the second capacitor C2 is further connected to the discharge circuit 20, and a second electrode of the second capacitor C2 is connected to the first voltage terminal V1. That is, the photosensitive control circuit 10 is formed by the photosensitive diode PD and the second capacitor C2 that are connected in parallel.

It will be noted that, at least one photosensitive diode PD is provided in the photosensitive control circuit 10, that is, one or more photosensitive diodes PD are provided. Optionally, referring to FIG. 8, the photosensitive control circuit 10 includes a plurality of photosensitive diodes connected in parallel, which may effectively enhance a sensing accuracy of the photosensitive control circuit 10 to the optical signal from the backlight 1002.

In addition, for example, the first electrode of the photosensitive diode PD is an anode and the second electrode of the photosensitive diode PD is a cathode. The first voltage terminal V1 connected to the second electrode of the photosensitive diode PD is a fixed voltage terminal or grounded. If the first voltage terminal V1 is a fixed voltage terminal, a voltage input via the first voltage terminal V1 should be lower than a voltage on the anode of the photosensitive diode PD.

Figure 9:
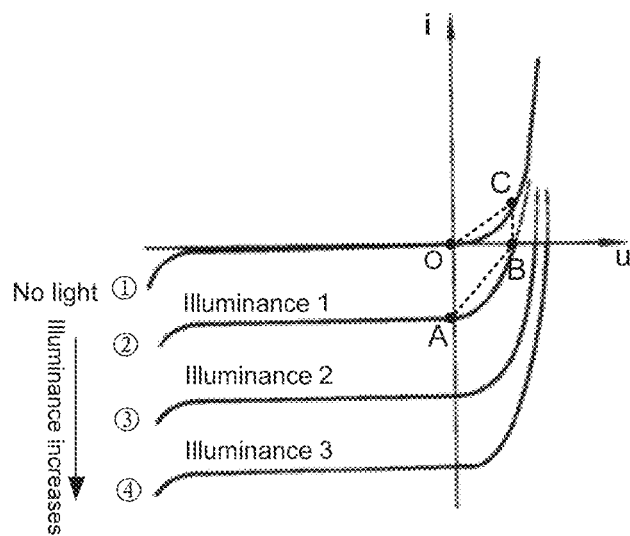
FIG. 9 is a volt-ampere curve diagram of a photosensitive diode, according to some embodiments of the present disclosure.

It will be understood that the photosensitive diode PD is a semiconductor device that converts the optical signal into an electrical signal, a core portion of the photosensitive diode PD is a PN junction, and a volt-ampere characteristic curve of the photosensitive diode PD is as shown in FIG. 9.

When there is no light, the photosensitive diode PD is forward turned on under an action of an applied forward voltage (for example, a storage voltage on the first electrode of the second capacitor C2), and a current is exponentially related to a terminal voltage (referring to a portion of the curve ① located in a first quadrant in FIG. 9).

When there is light, the photosensitive diode PD is reversely turned on and the curve ① moves down. A photocurrent of the photosensitive diode PD is negative and increases as its incident illuminance increases. For example, the photocurrent of the photosensitive diode PD increases from illuminance 1 to illuminance 3. Curve ② corresponding to the illuminance 1, curve ③ corresponding to illuminance 2, and curve ④ corresponding to the illuminance 3 are shown in FIG. 9. It will be seen that a current generated by the photosensitive diode PD when illuminated is a photocurrent, and a magnitude of the photocurrent varies with an illumination intensity (i.e., the illuminance). When the volt-ampere characteristic of the photosensitive diode PD is located in the fourth quadrant shown in FIG. 9, the photosensitive diode PD has photocell characteristics.

Figure 10:
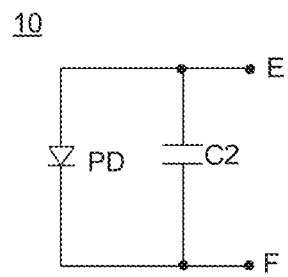
FIGS. 10-12 are schematic diagrams of working processes of a photosensitive control circuit in different working states, according to some embodiments of the present disclosure.
Figure 11:
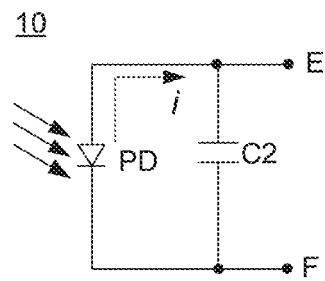
Figure 12:
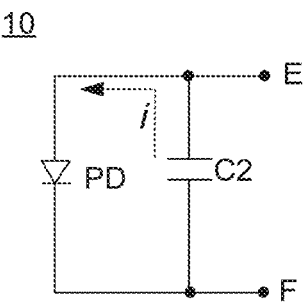

Based on the characteristics of the photosensitive diode PD, for working principles of the photosensitive control circuit 10 in different working states, refer to FIGS. 10-12. FIG. 10 is a schematic diagram of an operation of the photosensitive control circuit 10 in an initial state, FIG. 11 is a schematic diagram of an operation of the photosensitive control circuit 10 in the state where the backlight is turned on, and FIG. 12 is a schematic diagram of an operation of the photosensitive control circuit 10 in the state where the backlight is turned off.

Referring to FIGS. 9 and 10, the point O in FIG. 9 represents the volt-ampere characteristic of the photosensitive diode PD in the initial state. The current of the photosensitive diode PD is 0 A, and potentials at the two electrodes of the second capacitor C2 (the point E and the point F in FIG. 10) are the same, that is, $U_{EF}$=0 V.

Referring to FIGS. 9 and 11, in the state where the backlight is turned on, assuming that an illuminance of the backlight is the illuminance 1, the photosensitive diode PD is reversely turned on, and the volt-ampere characteristic of the photosensitive diode PD changes from the point O to the point A in FIG. 9. A reverse current i generated by the photosensitive diode PD charges the second capacitor C2, so that a difference between the voltages at the two electrodes of the second capacitor C2 rises, that is, the $U_{EF}$ increases. As the $U_{EF}$ increases, the reverse current i generated by the photosensitive diode PD gradually decreases, and eventually reaches an equilibrium at the point B in FIG. 9. That is, the reverse current i is reduced to 0, and the $U_{EF}$ is kept at a constant value Ux (a magnitude of the $U_{EF}$ may be determined according to a magnitude of the illuminance and the characteristics of the photosensitive diode PD).

Referring to FIGS. 9 and 12, in the state where the backlight is turned off, the second capacitor C2 is discharged. The photosensitive diode PD is forward turned on, and the volt-ampere characteristic of the photosensitive diode PD changes from a position of the point B to a position of the point C in FIG. 9. Charges stored in the second capacitor C2 are continuously released through the photosensitive diode PD, and the voltage $U_{EF}$ across the second capacitor C2 gradually decreases. As the $U_{EF}$ decreases, a forward current i of the photosensitive diode PD gradually decreases, and eventually reaches an equilibrium at the point O in FIG. 9. That is, the forward current i is reduced to 0, the $U_{EF}$ is reduced to 0, and the photosensitive control circuit 10 returns to the initial state.

Here, the photosensitive diode PD is made of pentacene, tungsten diselenide (WSe2) or other materials enabling the transistors to have a similar photosensitive property.

The above is merely an example of the photosensitive control circuit 10, other circuit structures capable of achieving a control function of the photosensitive control circuit 10 will not be repeated herein, but are all within the protection scope of the present disclosure.

Figure 8:
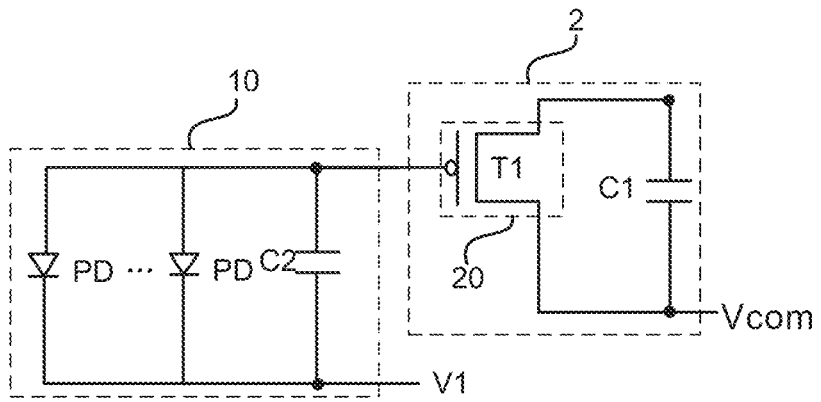
FIG. 8 is a schematic diagram showing a structure of yet another charge release circuit, according to some embodiments of the present disclosure.

In some embodiments, referring to FIGS. 7 and 8, the discharge circuit 20 includes a first transistor T1. A control electrode of the first transistor T1 is connected to the photosensitive control circuit 10, a first electrode of the first transistor T1 is connected to the first electrode of the first capacitor C1, and a second electrode of the first transistor T1 is connected to the common voltage terminal Vcom. In a case where the photosensitive control circuit 10 has the structure shown in FIG. 7 or FIG. 8, the control electrode of the first transistor T1 is connected to the anode of the photosensitive diode PD and the first electrode of the second capacitor C2 in the photosensitive control circuit 10.

When the photosensitive control circuit 10 controls the first transistor T1 to be turned on, since the second electrode of the first transistor T1 is connected to the common voltage terminal Vcom, the residual charges in the first capacitor C1 connected to the first electrode of the first transistor T1 may be released to the common voltage terminal Vcom through the first transistor T1.

Optionally, the first transistor T1 is a depletion-mode transistor; such as a P-channel depletion-mode transistor. Characteristics of the depletion-mode transistor are as follows: when a gate-source voltage of the depletion transistor Vgs is 0V, the depletion-mode transistor starts to be turned on, and a drain current is generated; and when the gate-source voltage Vgs is greater than 0V, the depletion-mode transistor is turned off, and the drain current is 0 A.

Based on this, in the state where the backlight is turned on, when the voltage $U_{EF}$ across the second capacitor C2 in the photosensitive control circuit 10 is increased to a constant value Ux; the gate-source voltage Vgs of the first transistor T1 is greater than 0 V, the first transistor T1 is turned off, and the display device is in a display state. In the state where the backlight is turned on, when the voltage $U_{EF}$ across the second capacitor C2 in the photosensitive control circuit 10 is reduced to 0 V, the gate-source voltage Vgs of the first transistor T1 is 0 V. In this case, the first transistor T1 is turned on, and the residual charges in the first capacitor C1 may be released through a loop formed by the first transistor T1.

It will be added that at least one first transistor T1 is provided in the discharge circuit 20, that is, the number of the first transistor(s) T1 is one or more. Optionally, the discharge circuit 20 includes a plurality of first transistors T1 connected in parallel, which may effectively enhance an effect of releasing the residual charges in the first capacitor C1 by the discharge circuit 10.

The above is merely an example of the discharge circuit 10, other structures capable of achieving a discharge function of the discharge circuit 20 will not be repeated herein, but are all within the protection scope of the present disclosure.

Figure 14:
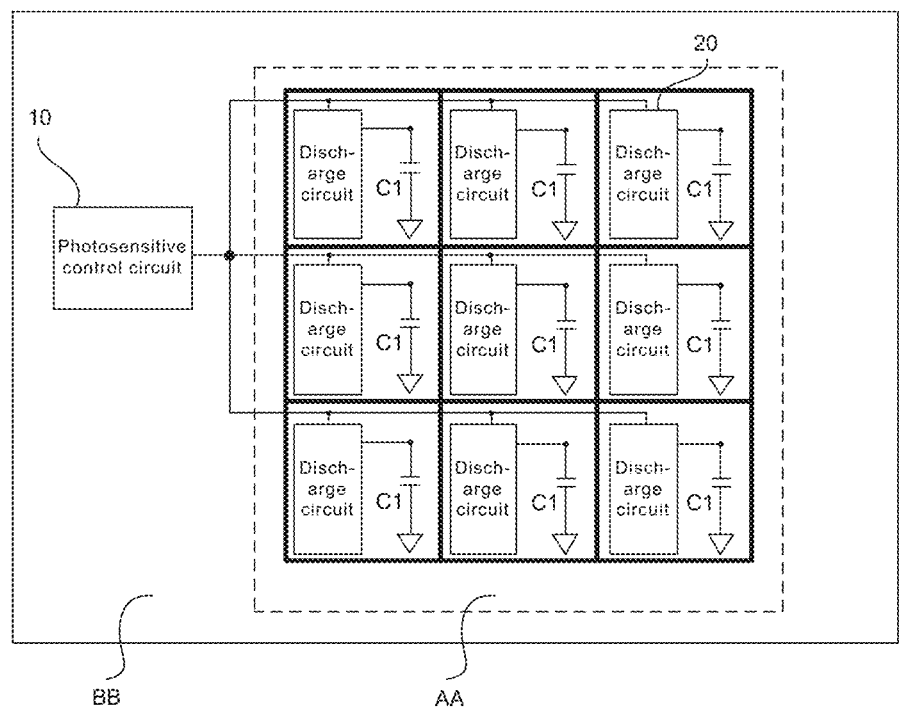
FIG. 14 is a schematic diagram showing a structure of an array substrate, according to some embodiments of the present disclosure.
Figure 15:
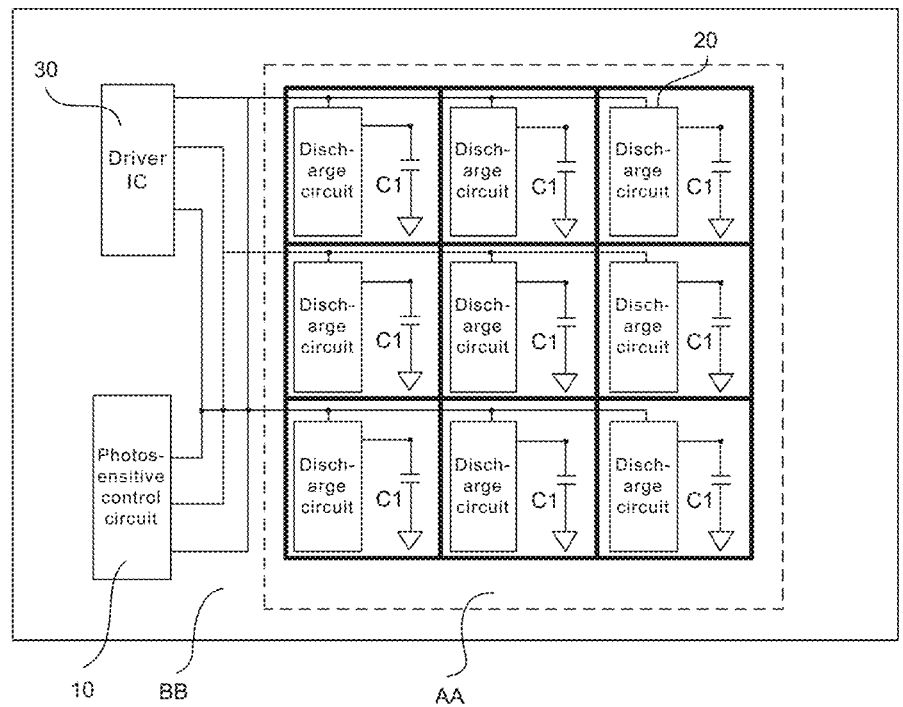
FIG. 15 is a schematic diagram showing a structure of another array substrate, according to some embodiments of the present disclosure.
Figure 16:
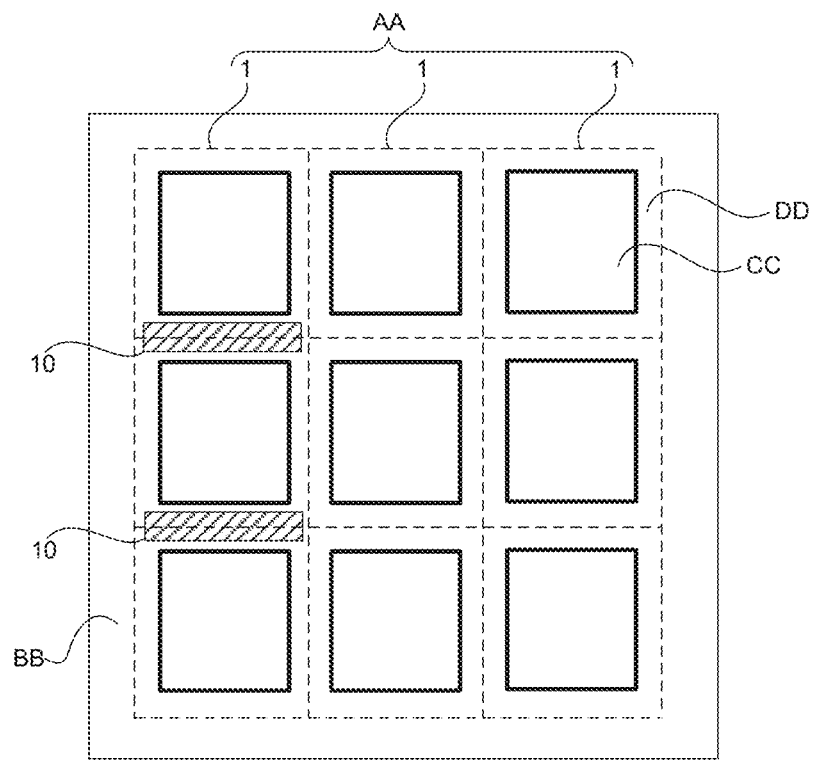
FIG. 16 is a schematic diagram showing a structure of yet another array substrate, according to some embodiments of the present disclosure.

Referring to FIG. 14 to FIG. 16, some embodiments of the present disclosure provide an array substrate 1001 including the above charge release circuit. The array substrate 1001 has same beneficial effects as the above charge release circuit, and details are not described herein again.

In some embodiments, the array substrate 1001 includes a base substrate and an array of thin film transistors disposed on the base substrate. The photosensitive diode PD in the photosensitive control circuit 10 and the thin film transistors in the array substrate are all semiconductor devices, and manufacturing processes of the photosensitive diode PD and the thin film transistors are similar. In some embodiments of the present disclosure, the charge release circuit including the photosensitive diode PD is integrated in the array substrate 1001, which is convenient to manufacture, high in integration, and is also advantageous for achieving a light and thin design of the display device 100.

For example, referring to FIG. 14, the array substrate 1001 further includes a display area AA and a non-display area BB disposed at a periphery of the display area AA. The at least one photosensitive control circuit 10 in the charge release circuit is disposed in the non-display area BB. Optionally, the non-display area BB is disposed around the display area AA or disposed on at least one side of the display area AA. The photosensitive diode PD in the photosensitive control circuit 10 and other transistors in other circuits (such as the pixel circuit(s)) are integrated in the array substrate 1001 and disposed in the non-display area BB of the array substrate 1001, which is convenient for manufacturing and is advantageous for reducing a process cost and ensuring an aperture ratio of the array substrate 1001.

In addition, referring to FIG. 15, the driver IC 30 may also be generally integrated in the array substrate 1001. In a case where the discharge circuit 20 in the pixel circuit is dually controlled by the photosensitive control circuit 10 and the driver IC 30, at least one discharge circuit 20 in the charge release circuit is further connected to the driver IC 30, and a manner in which the discharge circuit 20 is connected to the driver IC 30 may be set by referring to a manner in which the discharge circuit is connected to the photosensitive control circuit 10.

For example, referring to FIG. 16, the display area AA of the array substrate 1001 is provided with a plurality of pixels 1, and each pixel 1 includes an open region CC and a non-display region DD disposed at a periphery of the open region CC, The non-display region DD may also be understood as an opaque region between two adjacent pixels 1. The at least one photosensitive control circuit 10 in the charge release circuit is disposed in non-display regions DD of pixels 1 in which the pixel circuits connected to the at least one photosensitive control circuit 10 are respectively located.

Of course, if the array substrate 1001 is configured to be opposite to a color film substrate to form a liquid crystal display panel, the non-display region(s) DD in which the at least one photosensitive control circuit 10 is disposed in the array substrate 1001 should be disposed corresponding to a black matrix in the color film substrate. That is, an orthographic projection of the at least one photosensitive control circuit 10 on the base substrate is located within an orthographic projection of the black matrix in the color film substrate on the base substrate.

Figure 17:
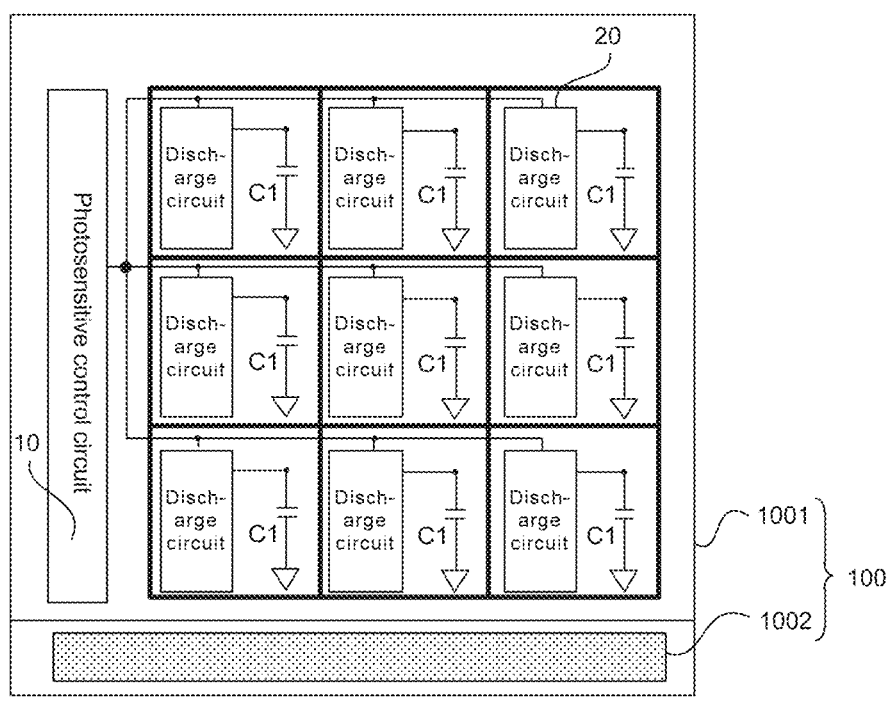
FIG. 17 is a schematic diagram showing a structure of a display device, according to some embodiments of the present disclosure.

Referring to FIG. 17, some embodiments of the present disclosure provide a display device 100 including the above array substrate 1001 and a backlight 1002 disposed at a side of the array substrate 1001. The display device 100 has same beneficial effects as the array substrate 1001 described above, and details are not described herein again.

In addition, for example, the above display device 100 includes a product or a component having a display function such as a liquid crystal display panel, a liquid crystal display, a liquid crystal television, a mobile phone, a tablet computer, a notebook computer, an electronic paper, a digital photo frame, or a navigator.

Some embodiments of the present disclosure provide a driving method of a charge release circuit, which is applied to the above display device 100. The driving method includes: controlling, by the photosensitive control circuit 10, the discharge circuit to be turned off in the state where the backlight 1002 of the display device 100 is turned on, so that the display device 100 displays an image; and controlling, by the photosensitive control circuit 10, the discharge circuit to be turned on in the state where the backlight 1002 of the display device 100 is turned off, so as to release residual charges in the first capacitor C1 connected to the discharge circuit 20. Beneficial effects that the driving method of a charge release circuit provided by some embodiments of the present disclosure may achieve are the same as those of the above charge release circuit, and details are not described herein again.

In some embodiments; the charge release circuit of the display device 100 has the structure shown in FIG. 7 or FIG. 13. The photosensitive control circuit 10 includes a photosensitive diode PD and a second capacitor C2, and the discharge circuit 20 includes a first transistor T1. Based on this, the step of controlling, by the photosensitive control circuit 10, the discharge circuit to be turned off in the state where the backlight 1002 of the display device 100 is turned on, so that the display device 100 displays the image, includes: turning on the backlight 1002; reversely turning on the photosensitive diode PD; charging the second capacitor C2; and controlling the first transistor T1 to be turned off; so that the display device 100 displays the image. The step of controlling, by the photosensitive control circuit 10, the discharge circuit to be turned on in the state where the backlight 1002 of the display device 100 is turned off, so as to release the residual charges in the first capacitor C1 connected to the discharge circuit 20, includes: turning off the backlight 1002; forward turning on the photosensitive diode PD; discharging the second capacitor C2; and controlling the first transistor T1 to be turned on, so as to release the residual charges in the first capacitor C1 through a loop formed by the first transistor T1.

Hereinafter; a driving method of a charge release circuit provided by some embodiments of the present disclosure will be illustratively described with reference to FIG. 13.

The backlight 1002 of the display device 100 is turned on, and a high level signal is input via the scanning signal terminal Gate to control the second transistor T2 to be turned on. A data signal is input via the data signal terminal Data, and the first capacitor C1 and a liquid crystal capacitor LC are charged, so that the display device displays the image. Here, the display device 100 is a liquid crystal display device, and the liquid crystal capacitor LC refers to a capacitor corresponding to liquid crystals in a pixel in which the first capacitor C1 is located. Moreover, a voltage VGL (a value of the voltage VGL is negative) is input via the first voltage terminal V1. In the state where the backlight 1002 is turned on, the second capacitor C2 in the photosensitive control circuit 10 is charged, and the voltage $U_{EF}$ across the second capacitor C2 are increased to an absolute value of the voltage VGL. In this case, the gate-source voltage Vgs of the first transistor T1 is greater than 0 V, and the first transistor T1 is controlled to be turned off.

The backlight 1002 of the display device 100 is turned off, and a low level signal is input via the scanning signal terminal Gate to control the second transistor T2 to be turned off, so that the display device stops displaying the image. Moreover, in the state where the backlight 1002 is turned off, the second capacitor C2 is discharged, and the voltage $U_{EF}$ across the second capacitor C2 is reduced to 0 V. In this case, the gate-source voltage Vgs of the first transistor T1 is 0 V, and the first transistor T1 is controlled to be turned on, so that the residual charges in the first capacitor C1 are released through the loop formed by the first transistor T1.

In the description of the above embodiments, specific features, structures, materials or characteristics may be combined in any suitable manner in any one or more embodiments or examples.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A charge release circuit, comprising:
   a plurality of pixel circuits; and
   at least one photosensitive control circuit, each photosensitive control circuit of the at least one photosensitive control circuit being connected to at least one pixel circuit of the plurality of pixel circuits, wherein
   each pixel circuit of the at least one pixel circuit includes:
   a discharge circuit connected to the photosensitive control circuit; and
   a first capacitor connected to the discharge circuit and configured to store a display driving signal, wherein the first capacitor is a pixel capacitor formed by a common electrode and a pixel electrode, and
   the photosensitive control circuit is configured to control the discharge circuit to be turned on in a state where a backlight of a display device is turned off to release residual charges in the first capacitor;
   wherein the photosensitive control circuit includes at least one photosensitive diode and a second capacitor; the discharge circuit includes a first transistor;
   a first electrode of each photosensitive diode is connected to a control electrode of the first transistor and a first electrode of the second capacitor, and a second electrode of the photosensitive diode is connected to a second electrode of the second capacitor, the second electrode of the second capacitor is connected to a first voltage terminal;
   a first electrode of the first transistor is connected to a first electrode of the first capacitor, and a second electrode of the first transistor is connected to a second electrode of the first capacitor, the second electrode of the first capacitor is connected to a common voltage terminal;
   the first electrode of the first capacitor is formed by the pixel electrode and the second electrode of the first capacitor is formed by the common electrode.

2. The charge release circuit according to claim 1, wherein the at least one photosensitive diode includes a plurality of photosensitive diodes connected in parallel.

3. The charge release circuit according to claim 1, wherein the first transistor is a depletion-mode transistor.

4. The charge release circuit according to claim 1, wherein the pixel circuit further includes a second transistor;
   a control electrode of the second transistor is connected to a scanning signal terminal, a first electrode of the second transistor is connected to a data signal terminal, and a second electrode of the second transistor is connected to the first electrode of the first capacitor; and
   a second electrode of the first capacitor is connected to the common voltage terminal.

5. The charge release circuit according to claim 1, wherein the at least one photosensitive control circuit includes a plurality of photosensitive control circuits connected in parallel.

6. The charge release circuit according to claim 1, wherein the at least one photosensitive control circuit includes a plurality of photosensitive control circuits;
   pixel circuits in at least one row are connected to one of the plurality of photosensitive control circuits; or
   pixel circuits in at least one column are connected to one of the plurality of photosensitive control circuits.

7. An array substrate, comprising the charge release circuit according to claim 1.

8. The array substrate according to claim 7, further comprising a driver IC, wherein the at least one discharge circuit in the charge release circuit is further connected to the driver IC.

9. The array substrate according to claim 7, wherein the array substrate has a display area and a non-display area disposed at a periphery of the display area, wherein the at least one photosensitive control circuit in the charge release circuit is disposed in the non-display area.

10. The array substrate according to claim 7, further comprising a plurality of pixels, wherein each pixel of the plurality of pixels is provided with a pixel circuit; and the at least one photosensitive control circuit in the charge release circuit is disposed in non-display region(s) of pixel(s) in which pixel circuit(s) connected to the at least one photosensitive control circuit are located.

11. A display device, comprising the array substrate according to claim 7.

12. A driving method of a charge release circuit, wherein the charge release circuit is that according to claim 1, and the method comprises:

controlling, by the photosensitive control circuit, the discharge circuit to be turned off in a state where a backlight of a display device is turned on, so that the display device displays an image; and controlling, by the photosensitive control circuit, the discharge circuit to be turned on in a state where the backlight of the display device is turned off, so as to release residual charges in the first capacitor connected to the discharge circuit; wherein controlling, by the photosensitive control circuit, the discharge circuit to be turned off in the state where the backlight of the display device is turned on, so that the display device displays the image, includes:

turning on the backlight, reversely turning on the photosensitive diode, charging the second capacitor, and controlling the first transistor to be turned off, so that the display device displays the image; and controlling, by the photosensitive control circuit, the discharge circuit to be turned on in the state where the backlight of the display device is turned off, so as to release the residual charges in the first capacitor connected to the discharge circuit, includes:

turning off the backlight, forward turning on the photosensitive diode, discharging the second capacitor, and controlling the first transistor to be turned on, so that the residual charges in the first capacitor are released through a loop formed by the first transistor.

13. The charge release circuit according to claim 1, wherein the photosensitive control circuit is further configured to control the discharge circuit to be turned off in a state where the backlight of the display device is turned on, so that the pixel circuit controls the display device to display an image.

* * * * *